United States Patent [19]

Walsh

[11] 4,243,702
[45] Jan. 6, 1981

[54] HEAT FUSIBLE POLYESTER AND POLYAMIDE DISPERSIONS

[75] Inventor: Robert M. Walsh, Wilmington, Del.

[73] Assignee: Hercules Incorporated, Wilmington, Del.

[21] Appl. No.: 53,450

[22] Filed: Jun. 29, 1979

[51] Int. Cl.$^3$ .................. B05D 5/00; C08L 93/04; C09D 11/08
[52] U.S. Cl. ..................... 427/256; 106/27; 106/28; 106/29; 106/30; 106/218; 106/220; 106/222; 106/227; 260/24; 260/26; 260/18 N; 260/22 CQ; 427/287; 427/288; 525/177; 525/184; 204/159.12; 260/37 N
[58] Field of Search ............ 260/24, 26, 18 N, 22 CQ; 525/177, 184; 106/27, 28, 29, 30, 218, 220, 222, 227; 427/256, 287, 288

[56] References Cited

U.S. PATENT DOCUMENTS

| | | | |
|---|---|---|---|
| 2,468,534 | 4/1949 | Young et al. | 525/184 |
| 3,412,104 | 11/1968 | McIntosh et al. | 260/21 |
| 3,455,856 | 7/1969 | Voedisch et al. | 260/22 R |
| 3,498,941 | 3/1970 | Hofton et al. | 525/177 |
| 3,778,394 | 12/1973 | Lovald et al. | 106/30 |
| 3,804,640 | 4/1974 | Buckwalter | 260/23 H |
| 3,881,942 | 5/1975 | Buckwalter | 106/30 |
| 3,896,064 | 7/1975 | Koishi et al. | 260/24 |
| 4,066,585 | 1/1978 | Schepp et al. | 260/24 |
| 4,079,026 | 3/1978 | Mone | 260/26 |
| 4,169,821 | 10/1979 | Werner et al. | 525/177 |

*Primary Examiner*—H. S. Cockeram
*Attorney, Agent, or Firm*—Marion C. Staves

[57] ABSTRACT

It has been discovered that pastes of particulate thermoplastic polymers dispersed in a soft resinous phase can be prepared which heat-set by fusion of the thermoplastic binder. Polyesters and polyamides have been found to be particularly useful. When pigmented or otherwise colored, these formulations have utility as printing inks. When uncolored, they can be used as clear overprint coatings. In addition, these fusible pastes have utility as specialty coatings in adhesives and can be fabricated into self-supporting shapes.

20 Claims, No Drawings

HEAT FUSIBLE POLYESTER AND POLYAMIDE DISPERSIONS

BACKGROUND OF THE INVENTION

Printing processes require that printing inks be both fluid and capable of subsequent ready conversion to a dry, smudge-resistant film once in place on paper or another substrate. One common type of printing ink consists primarily of a pigment and a binder which are suspended or dissolved in a volatile diluent. The binder serves the purpose of adhering the pigment to the printed substrate. the diluent must subsequently be removed by allowing it to evaporate either at room temperature, or for higher printing speeds, by heating. Large amounts of heat are needed to vaporize the ink diluent, which requires that substantial quantities of fuel be consumed. Since large volumes of air must be drawn over the drying ink film to remove the diluent vapor, frequently much heat is wasted. Further, the evaporation of the ink diluent into the open atmosphere can be a source of pollution. In many instances, it is necessary or desirable to burn off or otherwise remove the solvent vapor from the drying air before discharging it to the atmosphere. Additional fuel is consumed and special equipment must be installed for this purpose.

A second common type of printing ink consists of mixtures containing oleoresinous varnishes and/or drying oils which set by air oxidation. These inks set slowly so it is necessary to take precautions to avoid set-off (transfer) or ink between printed sheets.

Inks may also be formulated which contain drying oils or the like together with some binder and volatile diluent. In the usual printing operation, heat is applied to such an ink immediately after it is printed onto the substrate. At this stage, the diluent is driven off, reducing or minimizing problems of ink set-off. However, the ink is not fully set and rub resistance is inadequate. A subsequent drying stage is necessary in which the drying oil or the like hardens, as by oxidation and/or polymerization.

While it is necessary that a printing ink set rapidly and conveniently after printing, it is equally necessary that it not set or dry on the press. Inks containing volatile components may thicken on the press as the solvent evaporates, making it difficult or impossible to control the printing process. Air oxidizing varnished, drying-oils, and the like, may thicken or gum on the press on exposure to the atmosphere. Such inks are especially inclined to "skin over" when the press is shut down during a run. An ink which is not subject to such changes while on the printing press is said to "stay open".

Ink technologists have sought to achieve inks which set rapidly with a low level of energy input to initiate setting, which do not release polluting materials to the atmosphere, and which stay open to on press, while at the same time meeting the physical and mechanical requirements of the printing process. Much attention has been directed to highly chemically reactive formulations. After printing, such inks are set by polymerization and/or cross-linking which is initiated by heat or radiation. A typical chemically reactive system contains polyfunctional acrylate esters (often in combination with other unsaturated materials), one or more ultraviolet photoinitiators, pigment and a variety of secondary components to control ink physical properties. See U.S. Pat. No. 3,804,640 and U.S. Pat. No. 3,881,942, both to Buckwalter. In normal use, such inks are printed on presses equipped with ultraviolet lamps which expose the film on the paper or other substrate immediately after printing. The inks set rapidly and with essentially no emission of polluting materials. Inks based on such highly reactive materials, however, have limited storage stability. The acrylates and other reactive materials in common use have been found to be chemically incompatible with some pigments which are desirable in printing inks. They present toxicity hazards, or are dangerous eye irritants, and are frequently skin sensitizers. When the inks are designed to be set by an ultraviolet light initiated reaction, the ultraviolet radiation itself and the high voltages necessary to power the ultraviolet lamps are additional health and safety hazards.

U.S. Pat. No. 3,024,213 to Ludlow discloses a heat drying ink vehicle based on polyvinyl chloride plastisols, more particularly finely divided polyvinyl chloride polymer dispersed in liquid plasticizers, all of which have low viscosity and solubility parameters closely matched to polyvinyl chloride, and containing a compatible thermoplastic resinous binder to increase ink cohesion and tack. Further improvements in inks based on polyvinyl chloride and vinyl chloride copolymer plastisols are disclosed in U.S. Pat. No. 3,760,724 to Budzinski. These inks are set by applying heat which causes the liquid plasticizers and polyvinyl chloride or vinyl chloride copolymer to co-dissolve. Thus, such polyvinyl chloride plastisol-based inks are readily heat-settable without significant release of volatile materials to the atmosphere. These inks, however, do not have good press running characteristics. Undesirable build-up of material on the blanket of lithographic offset presses occurs when polyvinyl chloride plastisol inks are used. Further, both Ludlow and Budzinski require the use of at least one plasticizer in such polyvinyl chloride plastisol inks. Such plasticizers may, as Ludlow discloses, damage ordinary natural rubber rolls on printing presses. It is thus necessary that ink rolls of polyurethane rubber or other plasticizer resistant compositions be used.

SUMMARY OF THE INVENTION

The present invention provides nonvolatile, heat-set pastes. It has been discovered that pastes of particulate polyesters or polyamides dispersed in a soft resinous phase can be prepared which heat-set by the fusion of the polyester or polyamide binder. When pigmented or otherwise colored, these formulations have utility as printing inks. When uncolored, they can be used as clear over-print coatings. In addition, these fusible pastes have utility as specialty coatings and adhesives and can be fabricated into self-supporting shapes.

DESCRIPTION OF THE PREFERRED EMBODIMENTS

According to this invention, nonvolatile, heat-set vehicles for printing inks can be made by dispersing particulate polyester or polyamide polymer binder in a soft resinous phase. More particularly, the printing ink vehicles of this invention contain particular polyester or polyamide dispersed in a tackifying, cohesion-increasing material which may be a resin or mixture of resins whose softening point is either at or below room temperature, or has been lowered by dilution with an oil.

The binder materials used in this invention comprise particulate polyesters and polyamides having a crystallinity below about 20%, most preferably 10%. The glass transition temperature (Tg), or crystalline melting point, must be above room temperature.

Suitable polyester binder materials comprise the polyesterification products of one or more dicarboxylic acid (or the corresponding ester) and one or more diols with a weight average molecular weight of greater than 5000.

Suitable dicarboxylic acids may be aliphatic, aromatic, or alicyclic and may be saturated or unsaturated. These acids have the general formula

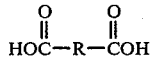

wherein R represents an alkylene radical, arylene radical, alkylene arylene alkylene radical, or cycloalkylene radical having from 1 to 36 carbon atoms. Throughout this specification the expression dicarboxylic acid is intended to include anhydrides of such acids where such anhydrides exist. Typical dicarboxylic acids include: malonic acid, succinic acid, glutaric acid, adipic acid, pimelic acid, suberic acid, azelaic acid, sebacic acid, phthalic acid, isophthalic acid, terephthalic acid, itaconic acid, maleic acid, maleic acid anhydrides, fumaric acid, phthalic acid anhydride, hexahydroterephthalic acid, and the like, and further include dimers of unsaturated fatty acids such as oleic acid, linoleic acid, and linolenic acid.

Suitable diols may be aliphatic, aromatic, or alicyclic. These diols have the general formula:

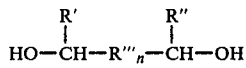

wherein R' and R" represent hydrogen or alkyl radicals having 1 to 3 carbon atoms, and R''' represents an alkylene radical, arylene radical, alkylene arylene alkylene radical, cycloalkylene radical, alkylene cycloalkylene alkylene radical, or alkylene oxy alkylene radical having from 1 to 36 carbon atoms and n is 0 or 1. Typical diols include: ethylene glycol, propylene glycols, butylene glycols, diethylene glycol, dipropylene glycols, triethylene glycol, 1,4- dihydroxymethylcyclohexane, isopropylidene bis (p-phenyleneoxypropanol-2), 1,4-dihydroxymethyl benzene, and the like.

Minor amounts of polyfunctional carboxylic acids or polyfunctional alcohols may be included to increase molecular weight, to modify crystallinity, or to modify melt flow properties, but in no case should they be included at such a level as to cause cross-linking of the polymer. Similarly, small amounts of monofunctional carboxylic acid or alcohols may be added to control the molecular weight of the products.

Suitable polyamide binder materials comprise the polycondensation product of one or more dicarboxylic acid (or the corresponding ester) and one or more diamine.

Suitable dicarboxylic acids are as specified for inclusion in polyester binder materials.

Piperazine is a suitable diamine as are other diamines which may be aliphatic, aromatic, or alicyclic. These diamines have the following general formula:

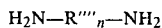

wherein R'''' represents an alkylene radical, arylene radical, alkylene arylene alkylene radical, cycloalkylene radical, or alkylene cycloalkylene alkylene radical having from 1 to 36 carbon atoms, where n is 0 or 1.

Typical diamines include piperazine, hydrazine, ethylene diamine, tetramethylene diamine, hexamethylene diamine, pentamethylene diamine, octamethylene diamine, decamethylene diamine, p-xylylene diamine, 1,4-diaminocyclohexane, and the like.

Minor amounts of polyfunctional carboxylic acids or polyfunctional amines may be included to increase molecular weight, modify crystallinity or to modify melt flow properties, but in no case should they be included at such a level as to cause cross-linking of the polymer. Similarly, small amounts of monofunctional carboxylic acids or amines may be added to control the molecular weight of the products.

While the particle size of the polyester or polyamide binder is not critical, for lithographic or letterpress inks particles about 0.05 to about 2.0 microns in cross-section are preferred, with particles of about 0.5 micron in cross-section being most preferable. Larger particles may give poor uniformity and press performance. In screen printing, much heavier ink films are printed so much larger particle sizes may be tolerated. The limit in particle size for inks used in screen printing is fixed by the mesh size of the printing screen and the thickness of the ink film desired. For use with coarse mesh screens and heavy ink films, particle sizes as high as about 50 microns can be used.

Polyester or polyamide particles of a size useful in this invention may be prepared by emulsifying the water immiscible solution of the desired polymer in water and stripping the solvent.

Dispersions of polyester or polyamide in a soft resinous phase can be achieved by blending into an aqueous polymer emulsion one or more of the liquid components of the soft resinous phase and stripping the water from the mix at a temperature low enough to avoid fusion of the polyester or polyamide. It is also possible to prepare these dispersions by freeze-drying or spray drying the emulsion in order to isolate the particulate polyester or polyamide and dispersing the dry polymer powder in the soft resinous phase.

Alternatively, particles may be prepared by grinding or milling the polyester or polyamide, or by controlled precipitation from solution. In many cases, a particle size classification process may be necessary to obtain the optimum size of the material.

In some cases, it may be desirable to include additives such as plasticizers, resins, pigments, dyes, flameproofing agents, etc. in the polyester or polyamide. This may be conveniently accomplished by dispersing or dissolving the additive in the polymer or polymer solution before converting it to small particle form.

The continuous soft resinous phase of the paste is comprised of a tackifying, cohesion-increasing material which may be a resin or mixture of resins with a softening point at or below room temperature, or which has been diluted with an oil to suitably lower the softening point. The term "resin" is here restricted to amorphous organic solids, semi-solids and viscous liquids with room temperature viscosities above about 2000 centipoise. Such resins are commonly polymeric, but number average molecular weight must be under about 5000. Typical classes of resins which may be used are hydrocarbon resins, including naturally occurring coal tar and other fossil resins, synthetic aliphatic and aromatic hydrocarbon resins prepared from petroleum- or coal-derived feedstocks, and resins based on pure hydrocarbon monomers and combination of monomers, such as styrene and alkyl-substituted styrenes, indene and dicyclopentadiene; terpene resins; rosin and rosin esters such as hydrogenated methyl ester of rosin and phenolic modified pentaerythritol ester of rosin; ketone formaldehyde thermoplastic resins; condensed ketone thermoplastic resins; and resins based on acrylate esters and alkyl substituted acrylate esters; and transesterification products of alcohols with dimethyl terephthalate process residues.

Diluent oils may be aliphatic, aromatic, or naphthenic in character, and may contain polar functionality, but must be compatible with and dissolve in the resin system. Typically, they have solubility parameters between about 7.0 and 8.5. They must be substantially nonvolatile at the temperature at which the ink is set, typically 75° C. or higher. It is important to choose diluents which do not rapidly solvant the particulate thermoplastic phase at room temperature. This may be accomplished by avoiding those diluent oils which closely match the solubility parameter of the particulate polymers.

There is no such restriction on the solubility parameter of the resin itself. The rate of solvation is slow enough that even inks containing resins which closely match the solubility parameter of the particulate thermoplastic may be prepared and printed. In extreme cases, solvation may proceed at a rate that would limit certain combinations of resin and thermoplastic polymers to applications where inks are prepared as needed, and are not stored longer than a day or so. Printing inks are commonly prepared as needed in larger printing plants.

The particulate polyester and polyamide and soft resin of this invention should be used in proportions such that the ratio of polymer to resin will preferably be between about 1:6 and about 1:1. Also, the ratio of soft resin to diluent oil may range from those cases in which the formulation is oil-free (i.e., where the soft resin is naturally thin enough to achieve the desired rheology in the final fusible past formulation) to about 1:15 ratio of resin to oil.

In addition to the above-described essential ingredients, when the pastes are used as printing inks surface active agents, pigment dispersing aids, waxes, slips aids, tack modifiers and the like may be included.

The primary mechanism by which the pasts of this invention set appears to be the fusion of the particulate thermoplastic binder to form a continuous film on heating the paste, in which the soft resinous phase is largely dissolved and/or entrapped. In some circumstances, it may be desirable for the paste film to harden further. This can be achieved by choosing for the soft resinous phase, either in whole or in part, materials capable of undergoing polymerization or cross-linking during the thermal fusion of the particulate thermoplastic material or subsequent to it. In such cases, it may be appropriate to include suitable catalysts, driers, accelerators, or other additives which are necessary or desirable to initiate or promote the desired polymerization or cross-linking reaction. Such subsequent hardening of the thermally set paste film may be achieved by including one or more unsaturated alkyd resins as part of the resinous phase, such as alkyds based on phthalic, isophthalic, adipic, azelaic, sebacic, terephthalic, hydrophthalic, maleic, fumaric, and benzoic acids and anhydrides modified with unsaturated fatty acids; rosin modified alkyds; phenolic modified alkyds; epoxy alkyds; polyamide alkyds; isocyanate alkyds; and styrene or substituted styrene alkyds, such as styrene and acrylonitrile modified alkyds. The unsaturated isophthalic alkyds are preferred.

Similarly, drying oils or semi-drying oils such as linseed oil, tung oil, oiticica oil, dehydrated caster oil, soya oil, safflower oil, fish oil, tall oil, or the like may be used as hardening agents in the resinous phase. These oils may be used in the natural state or may be bodied to increase viscosity by heating or other partial polymerization.

When such oxidation drying materials are included in the paste, suitable driers or catalysts which promote oxidative cross-linking and polymerization may be included, typically salts of complexes of metals capable of existing in more than one valence state, such as vanadium oxyacetylacetonate, vanadium oxysulfate, vanadium oxy-1,1,1-tri-fluoroacetylacetonate, vanadium oxy-1-phenylacetylacetonate, ferric acetylacetonate-benzoin, manganese octoate, lead naphthenate, cobaltic acetylacetonate, titanyl acetylacetonate, cobaltous naphthenate, cobaltous 2-ethylhexanoate, cobaltous sterate, cobaltic sterate, cobaltous acetyl-acetonate, manganous sterate, manganic sterate, manganous acetylacetonate, manganic acetylacetonate, manganese naphthenate, zirconium acetylacetonate, vanadyl naphthenate, ferrous sulfate, ferrous pyrophosphate, ferrous sulfide, the ferrous complex of ethylenedinitrilotetraacetic acid, ferrous o-phenanthroline, ferrous ferrocyanide, ferrous acetylacetonate and the corresponding nickel, copper, mercury and chromium compounds.

The use of a colorant is not critical to the invention. The fusible paste dispersion can be used unpigmented as a clear overprint varnish. When a colorant is desired, it may be a pigment or dye. The colorant normally may be most conveniently dispersed in the continuous soft resinous phase of the ink. However, it may be desirable in some circumstances to include the colorant within the particulate thermoplastic material.

When used as printing inks, the pastes of this invention may be printed by any of the printing processes which require a paste type ink. Common printing processes in which paste inks are used include letterpress, lithography, and screen printing. Printing may be sheet-fed or web-fed, and may be on paper, board, fabric, metal, glass, plastic, wood, leather, rubber, or other substrates. Variations in ink rheology and tack properties are required for optimum performance for any chosen printing process and substrate. Inks based on the pastes of this invention can be suitably formulated to meet these specific requirements by appropriate choice and relative concentration of materials used in the resinous phase. This will be readily apparent to those skilled in printing ink formulation.

In addition to printing, pastes may be applied to substrates by roll-coating, doctoring, screening, dipping, or the like, especially for the preparation of specialty coatings or for use as heat-set thermoplastic adhesives. Self supporting shapes may be prepared by cavity molding, dip molding, rotational molding, slush molding or the like. Variations in paste rheology and tack properties are required for optimum performance for any chosen fabrication process. The pastes can be formulated to meet these requirements by appropriate choice and relative concentration of materials used in the resinous phase. This will be readily apparent to those skilled in the art of materials fabrication.

After printing, coating or forming, the pastes of this invention may be set by heating to at least about 75° C. and preferably to at least about 150° C. to fuse the particulate thermoplastic resin. This may be done in a conventional forced-air drying oven, in common use in the printing industry. However, since no air flow is necessary to remove volatile material, it is frequently advantageous to heat the paste film by irradiation, typically in the infrared spectral region. At 150° C., the paste may be fused by heating for from about 0.01 second to about 2 minutes, longer times being required for those pastes which do not contain pigments than for those which do contain pigment. Also, the duration of the heating may vary depending upon the thickness of the paste coating, substrate, or purpose for which the paste is used (e.g., adhesive, molding, material, etc.).

EXAMPLE 1

An amorphous polyester is prepared which consists of 47.5 mole percent isophthalate, 2.5 mole percent succinate and 50 mole percent of isopropylidene bis(p-phenyleneoxy-propanol-2) (i.e., the condensation product of bisphenol A and propylene oxide in a mole ratio of 1 to 2). The polyester has a $Tg = 67°$ C., and a weight average molecular weight $Mw = 8580$. The polyester is ground to a particle size ranging from about 1 micron to 20 microns by milling in a ball mill with ceramic balls covered with heptane for about 17 hours. A printing ink is prepared by blending together the following materials using a Hoover Automatic Muller to achieve a uniform paste:

| Ingredients | Parts by Weight |
| --- | --- |
| Polyester | 25 |
| Phenolic modified pentaerythritol ester of rosin* | 5 |
| Hydrogenated methyl ester of rosin - with a viscosity of about 5500 centipoise* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm². The surface of the sheet reaches a temperature above 75° C. After setting, the ink is dry and resistant to smudging or smearing.

The above ink is screen printed onto paper, and infrared set as above. After setting, the ink is dry and resistant to smudging or smearing.

EXAMPLE 2

Using the particulate polyester of Example 1, a printing ink is prepared by blending together the following materials using an automatic muller achieving a uniform paste:

| Ingredients | Parts by Weight |
| --- | --- |
| Polyester | 25 |
| Hydrocarbon resin - largely based on styrene with a ring and ball softening point of 30° C. and number average molecular weight below 5000.* | 5 |
| Extending oil - petroleum derived; solubility parameter of about 7.8; less than 0.1% volatility at 150° C.* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm². After setting, the ink is dry and resistant to smudging or smearing.

The above ink is screen printed onto paper, and infrared set as in Example 1. After setting, the ink is dry and resistant to smudging or smearing.

EXAMPLE 3

An amorphous polyester is chosen which consists of the condensation product of terephthalic acid and a small amount of isophthalic acid with neopentyl glycol. The polyester has a $Tg = 60°$ C., and a weight of 21,100. The polyester is ball milled as in Example 1 to a particle size ranging from about 1 micron to 20 microns. A printing ink is prepared by blending together the following materials using an automatic muller achieving a uniform paste:

| Ingredients | Parts by Weight |
| --- | --- |
| Polyester | 25 |
| Phenolic modified pentaerythritol ester of rosin* | 5 |
| Hydrogenated methyl ester of rosin - with a viscosity of about 5500 centipoise* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm². After setting, the ink is dry and resistant to smudging or smearing.

The above ink is screen printed onto paper, and infrared set as in Example 1. After setting, the ink is dry and resistant to smudging or smearing.

EXAMPLE 4

Using the particulate polyester of Example 3, a printing ink is prepared by blending together the following materials using an automatic muller achieving a uniform paste:

| Ingredients | Parts by Weight |
| --- | --- |
| Polyester | 25 |
| Phenolic modified pentaerythritol ester of rosin* | 5 |
| Extending oil - petroleum derived; solubility parameter of about 7.8; less than 0.1% volatility at 150° C.* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm$^2$. After setting, the ink is dry and resistant to smudging or smearing.

The above ink is screen printed onto paper, and infrared set as in Example 1. After setting, the ink is dry and resistant to smudging or smearing.

EXAMPLE 5

Using the particulate polyester of Example 3, a printing ink is prepared by blending together the following materials using an automatic muller achieving a uniform paste:

| Ingredients | Parts by Weight |
|---|---|
| Polyester | 25 |
| Hydrocarbon resin - largely based on styrene with a ring and ball softening point of 30° C. and number average molecular weight below 5000.* | 5 |
| Extending oil - petroleum derived; solubility parameter of about 7.8; less than 0.1% volatility at 150° C.* | 55 |
| Carbon black | 15 |

*Dissolved together before blending with other ingredients the ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm$^2$. After setting, the ink is dry and resistant to smudging or smearing.

The above ink is screen printed onto paper, and infrared set as in Example 1. After setting, the ink is dry and resistant to smudging or smearing.

EXAMPLE 6

A polyester is selected with a crystallinity of about 6.5%, consisting of the condensation product of iso- and terephthalates with ethylene glycol. The polyester had a Tg=22° C., a crystalline melting point of about 91° C. and a molecular weight above 5000. The polyester is dissolved in methylene chloride to give a 20% by weight solution. The solution is mixed with water in the weight ratio 3 to 2, in which is dissolved 3 parts per hundred by weight based on polyester of sodium lauryl sulfate. The mix is subjected to high shear resulting in a stable emulsion. The methylene chloride is vacuum stripped from the emulsion and the resulting polyester in water emulsion is freeze dried, resulting in polyester particles of about 3 to 10 microns. A printing ink is prepared by blending together the following materials using an automatic muller achieving a uniform paste:

| Ingredients | Parts by Weight |
|---|---|
| Polyester | 25 |
| Phenolic modified pentaerythritol ester of rosin* | 5 |
| Hydrogenated methyl ester of rosin - with a viscosity of about 5500 centipoise* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm$^2$. After setting, the ink is dry and resistant to smudging or smearing.

The above ink is screen printed onto paper, and infrared set as in Example 1. After setting, the ink is dry and resistant to smudging or smearing.

EXAMPLE 7

A polyamide is selected with a crystallinity of about 10° C., consisting of two condensation products of dimerized vegetable fatty acids and ethylene diamine containing a small amount of diethylene triamine. The polyamide has a Tg=−9° C., a crystalline melting point of about 75° C. and a molecular weight above 5000. The polyamide is ball milled as in Example 1 to a particle size of about 1 micron. A printing ink is prepared by blending together the following materials using an automatic muller achieving a uniform paste:

| Ingredients | Parts by Weight |
|---|---|
| Polyamide | 25 |
| Phenolic modified pentaerythritol ester of rosin* | 5 |
| Extending oil - petroleum derived; solubility parameter of about 7.8; less than 0.1% volatility at 150° C.* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9W/cm$^2$. After setting, the ink is dry and resistant to smudging or smearing.

The above ink is screen printed onto paper, and infrared set as in Example 1. After setting, the ink is dry and resistant to smudging or smearing.

EXAMPLE 8

Using the particulate polyamide of Example 7, a printing ink is prepared by blending together the following materials using an automatic muller achieving a uniform paste:

| Ingredients | Parts by Weight |
|---|---|
| Polyamide | 25 |
| Phenolic modified pentaerythritol ester of rosin* | 5 |
| Hydrogenated methyl ester of rosin - with a viscosity of about 5500 centipoise* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm$^2$. After setting, the ink is dry and resistant to smudging or smearing.

The above ink is screen printed onto paper, and infrared set as in Example 1. After setting, the ink is dry and resistant to smudging or smearing.

EXAMPLE 9

Using the particulate polyamide of Example 7, a printing ink is prepared by blending together the following materials using an automatic muller achieving a uniform paste:

| Ingredients | Parts by Weight |
|---|---|
| Polyamide | 25 |
| Hydrocarbon resin - largely based on styrene with a ring and ball softening point of 30° C. and a number average molecular weight below 5000.* | 5 |
| Extending oil - petroleum derived; solubility parameter of about 7.8; less than 0.1% volatility at 150° C.* | 55 |
| Carbon black | 15 |

*Dissolved together before blending with other ingredients

The ink is printed on an offset proof press. The printed sheets are passed at about 65 meters/minute under two successive near IR lamps, subjecting the printed sheets to radiation peaking at about 1.2 microns wavelength at an average energy density of about 6.9 W/cm$^2$. After setting, the ink is dry and resistant to smudging or smearing.

The above ink is screen printed onto paper, and infrared set as in Example 1. After setting, the ink is dry and resistant to smudging or smearing.

What I claim and desire to protect by Letters Pat. is:

1. A composition of matter in paste form comprising discrete solid particles of a thermoplastic polymeric material selected from polyesters and polyamides having a crystallinity below about 20%, a glass transition temperature or crystalline melting point above room temperature and a particle diameter between about 0.5 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

2. The composition of claim 1 wherein the thermoplastic polymer is the polyesterification product of at least one dicarboxylic acid having the general formula

wherein R represents an alkylene radical, arylene radical, alkylene arylene alkylene radical or cycloalkylene radical having from 1 to 36 carbon atoms, with at least one diol having the general formula

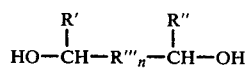

wherein R' and R" represent hydrogen or alkyl radicals having 1 to 3 carbon atoms and R''' represents an alkylene radical, arylene radical, alkylene arylene alkylene radical, cycloalkylene radical, alkylene cycloalkylene alkylene radical or alkylene oxy alkylene radical having from 1 to 36 carbon atoms and n is an integer from 0 to 1.

3. The composition of claim 2 wherein the polyester is prepared from isopthalic acid, succinic acid, and the condensation product of bisphenol A with propylene oxide.

4. The composition of claim 2 wherein the polyester is prepared from terephthalic acid, isophthalic acid, and neopentyl glycol.

5. The composition of claim 2 wherein the polyester is prepared from terephthalic acid, isophthalic acid, and ethylene glycol.

6. The composition of claim 1 wherein the thermoplastic polymer is a polyamide prepared from the polycondensation of at least one dicarboxylic acid having the general formula

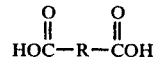

wherein R represents an alkylene radical, arylene radical, alkylene arylene alkylene radical, or cycloalkylene radical with at least one diamine having the following general formula

wherein R'''' represents an alkylene radical, arylene radical, alkylene arylene alkylene radical, cycloalkylene radical, or alkylene cycloalkylene alkylene radical having from 1 to 36 carbon atoms and n is an integer from 0 to 1.

7. The composition of claim 6 wherein the polyamide is prepared from dimerized vegetable fatty acids, ethylene diamine and diethylene triamine.

8. The composition of claim 1 wherein the tackifying, cohesion-increasing material comprises a resin or mixture of resins whose softening point is at or below room temperature.

9. The composition of claim 1 wherein the tackifying, cohesion-increasing material comprises a mixture of at least one resin and at least one diluent oil as a softening point lowering agent, the ratio of said resin to said oil being from about 1:0 to about 1:15.

10. The composition of claim 1 wherein the tackifying, cohesion-increasing material is selected from a hydrocarbon resin, an ester of rosin and mixtures thereof.

11. The composition of claim 10 wherein the hydrocarbon resin is an aromatic hydrocarbon resin.

12. The composition of claim 10 wherein the ester of rosin is selected from a methyl ester of rosin, methyl ester of hydrogenated rosin, methyl ester of disproportionated rosin and esters and modified esters of rosin with polybasic alcohols.

13. The composition of claim 1 further comprising coloring material.

14. The composition of claim 1 further comprising at least one hardening agent selected from drying oils and unsaturated alkyds.

15. The composition of claim 14 wherein the hardening agent is selected from linseed oil, bodied linseed oil and long oil isophthalic alkyd.

16. A printing ink in paste form comprising (1) a colorant, (2) discrete solid particles of a thermoplastic polymeric material selected from polyesters and polyamides having a crystallinity below about 20%, a glass transition temperature or crystalline melting point above room temperature and a particle diameter between about 0.05 micron and about 50 microns, and (3) a tackifying, cohesion-increasing material whose softening point is at or below room temperature, said polymeric material and said cohesion-increasing material being present in said printing ink in a ratio of polymeric material to cohesion-increasing material of between about 1:6 to about 1:1.

17. An adhesive composition in paste form comprising discrete solid particles of a thermoplastic polymeric material selected from polyesters and polyamides having a crystallinity below about 20%, a glass transition temperature or crystalline melting point above room temperature and a particle diameter between about 0.05 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

18. A molding material composition in paste form comprising discrete solid particles of a thermoplastic polymeric material selected from polyesters and polyamides having a crystallinity below about 20%, a glass transition temperature or crystalline melting point above room temperature and a particle diameter between about 0.05 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

19. A process comprising printing onto the surface of a substrate a composition in paste form comprising (1) a colorant, (2) discrete solid particles of a thermoplastic polymeric material selected from polyesters and polyamides having a crystallinity below about 20%, a glass transition temperature or crystalline melting point above room temperature and a particle diameter between about 0.05 micron and about 50 microns, and (3) a tackifying, cohesion-increasing material whose softening point is at or below room temperature, said polymeric material and said cohesion-increasing material being present in said composition in a ratio of polymeric material to cohesion-increasing material of between about 1:6 to about 1:1 and heating the surface of the substrate for a length of time at a temperature sufficient to fuse the composition.

20. The printing ink of claim 14 wherein the colorant is carbon black.

* * * * *